(12) United States Patent
Zhao et al.

(10) Patent No.: US 11,551,633 B2
(45) Date of Patent: Jan. 10, 2023

(54) DIRECTIONAL DISPLAY METHOD AND APPARATUS FOR AUDIO DEVICE AND AUDIO DEVICE

(71) Applicant: GOERTEK INC., Shangdong (CN)

(72) Inventors: Jifu Zhao, Shangdong (CN); Xuehui Dong, Shandong (CN)

(73) Assignee: GOERIEK INC., Shandong (CN)

( * ) Notice: Subject to any disclaimer, the term of this patent is extended or adjusted under 35 U.S.C. 154(b) by 89 days.

(21) Appl. No.: 17/309,139

(22) PCT Filed: Dec. 29, 2018

(86) PCT No.: PCT/CN2018/125272
§ 371 (c)(1),
(2) Date: Apr. 29, 2021

(87) PCT Pub. No.: WO2020/087751
PCT Pub. Date: May 7, 2020

(65) Prior Publication Data
US 2022/0013080 A1    Jan. 13, 2022

(30) Foreign Application Priority Data

Oct. 29, 2018 (CN) .......................... 201811271462.1

(51) Int. Cl.
*G09G 5/00* (2006.01)
*G06V 40/19* (2022.01)
(Continued)

(52) U.S. Cl.
CPC ............. *G09G 5/003* (2013.01); *G06V 40/19* (2022.01); *H04N 5/2258* (2013.01);
(Continued)

(58) Field of Classification Search
CPC ........ G06V 40/19; H04R 1/323; H04R 1/028; H04R 2499/15; H04R 2201/025;
(Continued)

(56) References Cited

U.S. PATENT DOCUMENTS 9,256,911 B1   2/2016  Parsons
10,192,284 B2 * 1/2019  Lee .................. G08B 13/19628
(Continued)

FOREIGN PATENT DOCUMENTS

CN    102033549 A    4/2011
CN    103235645 A    8/2013
(Continued)

*Primary Examiner* — Vinh T Lam
(74) *Attorney, Agent, or Firm* — LKGlobal | Lorenz & Kopf, LLP (57) ABSTRACT

The present disclosure discloses a method and apparatus for directional display of an audio device, and an audio device. The audio device according to the present disclosure includes a display screen whose position is adjustable, and the method according to the present disclosure includes, by using a spherical camera array, determining a spatial position of a user; according to a relation among the spatial position of the user, a center position of the audio device and a center position of the display screen, determining a horizontal compensation angle and a vertical compensation angle of a display direction of the display screen relative to the spatial position of the user; and adjusting the display direction of the display screen, to cause the horizontal compensation angle and the vertical compensation angle to be zero.

15 Claims, 5 Drawing Sheets

(51) Int. Cl.
*H04N 5/225* (2006.01)
*H04N 5/232* (2006.01)
*H04R 1/02* (2006.01)
*H04R 1/32* (2006.01)

(52) U.S. Cl.
CPC ......... *H04N 5/23238* (2013.01); *H04R 1/028* (2013.01); *H04R 1/323* (2013.01); *G09G 2320/068* (2013.01); *G09G 2354/00* (2013.01); *H04R 2499/15* (2013.01)

(58) Field of Classification Search
CPC .......... H04R 2420/07; H04R 2201/028; H04N 5/23238; H04N 5/2258; G09G 5/003; G09G 2354/00; G09G 2320/068; G06F 3/147
See application file for complete search history.

(56) References Cited

U.S. PATENT DOCUMENTS

| | | | | |
|---|---|---|---|---|
| 10,306,360 | B2 * | 5/2019 | Luo | H04S 3/006 |
| 10,656,900 | B2 * | 5/2020 | Katsumata | H04N 21/439 |
| 11,089,351 | B2 * | 8/2021 | Yoshizawa | H04N 21/42222 |
| 11,120,775 | B2 * | 9/2021 | Hamaker | G09G 5/377 |
| 2015/0185832 | A1 | 7/2015 | Locker et al. | |
| 2017/0278476 | A1 * | 9/2017 | Yu | G06F 3/013 |

FOREIGN PATENT DOCUMENTS

| | | | | |
|---|---|---|---|---|
| CN | 103529853 A | | 1/2014 | |
| CN | 103760975 A | | 4/2014 | |
| CN | 103796056 A | * | 5/2014 | |
| CN | 105301789 A | * | 2/2016 | |
| CN | 105892647 A | | 8/2016 | |
| CN | 105955311 A | * | 9/2016 | |
| CN | 105955311 A | | 9/2016 | |
| CN | 106155200 A | | 11/2016 | |
| CN | 106534766 A | | 3/2017 | |
| CN | 106569611 A | * | 4/2017 | ............ G06F 3/011 |
| CN | 106919246 A | * | 7/2017 | |
| CN | 106970698 A | * | 7/2017 | ............ G05D 27/02 |
| CN | 107024214 A | | 8/2017 | |
| CN | 107024214 A | * | 8/2017 | |
| CN | 107423021 A | * | 12/2017 | |
| CN | 207249492 U | * | 4/2018 | |
| CN | 207249492 U | | 4/2018 | |
| CN | 207410495 U | | 5/2018 | |
| CN | 207410495 U | * | 5/2018 | ............... H04R 1/20 |
| CN | 105892647 B | * | 9/2018 | ............ G06F 3/013 |
| CN | 108541376 A | * | 9/2018 | ............ G09G 5/003 |
| CN | 108563410 A | | 9/2018 | |
| CN | 108614583 A | * | 10/2018 | |
| CN | 108614583 A | | 10/2018 | |
| CN | 109121031 A | * | 1/2019 | ......... G06K 9/00248 |
| CN | 111885342 A | * | 11/2020 | ............ H04N 7/142 |
| CN | 113096599 A | * | 7/2021 | |
| JP | H04301671 A | | 10/1992 | |
| WO | WO-2020087748 A1 | * | 5/2020 | ........... G06F 3/0481 |
| WO | WO-2020087751 A1 | * | 5/2020 | ........ G06K 9/00248 |
| WO | WO-2021212608 A1 | * | 10/2021 | ............... G01S 5/18 |

* cited by examiner

DIRECTIONAL DISPLAY METHOD AND APPARATUS FOR AUDIO DEVICE AND AUDIO DEVICE

CROSS-REFERENCE TO RELATED APPLICATIONS

This application is a U.S. National-Stage entry under 35 U.S.C. § 371 based on International Application No. PCT/CN2018/125272, filed Dec. 29, 2018 which was published under PCT Article 21(2) and which claims priority to Chinese Application No. 201811271462.1, filed Oct. 29, 2018, which are all hereby incorporated herein in their entirety by reference.

TECHNICAL FIELD

This Application pertains to a method and apparatus for directional display of an audio device, and an audio device.

BACKGROUND

With the growth in the living standard, smart-home devices are becoming increasingly popular in everyday life. Smart loudspeaker boxes, as one of them, are immensely popular. Some of the smart multimedia devices in the market are mostly provided with a display screen. The display screen can not only be used to display the relevant information, but also realize the man-machine-interaction controlling of the smart loudspeaker box by touching the display screen.

Currently, the display directions of the display screens of smart loudspeaker boxes are generally fixed, and cannot be adjusted in real time to track the user in real time for directional display, so that the user must move to face the display screen or manually move the loudspeaker box, when watching the display screen or performing a touch operation, which results in a poor man-machine interaction, and affects the user experience. In addition, other objects, desirable features and characteristics will become apparent from the subsequent summary and detailed description, and the appended claims, taken in conjunction with the accompanying drawings and this background.

SUMMARY

The present disclosure provides a directional display method and device of an audio device, and an audio device, to solve the problem in the prior art that the display screen cannot accurately face the user, which results in a poor man-machine interaction.

One aspect of the present disclosure provides a directional display method of an audio device, wherein the audio device comprises a display screen whose position is adjustable, and the method according to the present disclosure comprises:

determining a spatial position of a user; according to a relation among the spatial position of the user, a center position of the audio device and a center position of the display screen, determining a horizontal compensation angle and a vertical compensation angle of a display direction of the display screen relative to the spatial position of the user; and adjusting the display direction of the display screen, so that the horizontal compensation angle and the vertical compensation angle are zero.

The directional display method according to the present disclosure, after determining the spatial position of the user, by using the position relation among the spatial position of the user, the center position of the audio device and the center position of the display screen, can determine the horizontal compensation angle and the vertical compensation angle of the display direction of the display screen relative to the spatial position of the user; and, by adjusting the two degrees of freedom of the display screen, can adjust both of the horizontal compensation angle and the vertical compensation angle to be zero, and realize that the display direction of the display screen in real time and accurately points to the spatial position of the user, which ensures that the user is within the optimum watching area of the audio device, thereby improving the visual experience of the user.

Another aspect of the present disclosure provides a directional display apparatus of an audio device, wherein the audio device comprises a display screen whose position is adjustable, and the apparatus according to the present disclosure comprises: a locating unit configured for determining a spatial position of a user; a calculating unit configured for, according to a relation among the spatial position of the user, a center position of the audio device and a center position of the display screen, determining a horizontal compensation angle and a vertical compensation angle of a display direction of the display screen relative to the spatial position of the user; and an adjusting unit configured for adjusting the display direction of the display screen, so that the horizontal compensation angle and the vertical compensation angle are zero.

The directional display apparatus according to the present disclosure, after determining the spatial position of the user by the locating unit, with the calculating unit, by using the position relation among the spatial position of the user, the center position of the audio device and the center position of the display screen, can determine the horizontal compensation angle and the vertical compensation angle of the display direction of the display screen relative to the spatial position of the user; and, with the adjusting unit, by adjusting the two degrees of freedom of the display screen, can adjust both of the horizontal compensation angle and the vertical compensation angle to be zero, and realize that the display direction of the display screen in real time and accurately points to the spatial position of the user, which ensures that the user is within the optimum watching area of the audio device, thereby improving the visual experience of the user.

Another aspect of the present disclosure provides an audio device, wherein the audio device comprises a spherical camera array and a display screen whose position is adjustable, and further comprises a processor and a machine-readable storage medium that stores a machine-executable instruction, and by reading and executing the machine-executable instruction in the machine-readable storage medium, the processor can implement the directional display method of the audio device described above.

The audio device according to the present disclosure, after determining the spatial position of the user, by using the position relation among the spatial position of the user, the center position of the audio device and the center position of the display screen, can determine the horizontal compensation angle and the vertical compensation angle of the display direction of the display screen relative to the spatial position of the user; and by adjusting the two degrees of freedom of the display screen, can adjust both of the horizontal compensation angle and the vertical compensation angle to be zero degree, and realize that the display direction of the display screen in real time and accurately points to the spatial position of the user, which ensures that the user is within the optimum watching area of the audio device, thereby improving the visual experience of the user.

Another aspect of the present disclosure provides a machine-readable storage medium, wherein the machine-readable storage medium stores a machine-executable instruction, and the machine-executable instruction, when executed by a processor, implements the directional display method of the audio device described above.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In order to make the objects, the technical solutions and the advantages of the present disclosure clearer, the embodiments of the present disclosure will be described below in further detail with reference to the drawings.

The embodiments of the present disclosure will be described below with reference to the drawings. However, it should be understood that the description is only exemplary, and is not intended to limit the scope of the present disclosure. Moreover, in the following description, the description on well-known structures and techniques are omitted, in order to prevent unnecessary confusion of the concepts of the present disclosure.

The terms used herein are merely intended to describe the specific embodiments, and are not intended to limit the present disclosure. The words used herein "a", "an" and "the" should encompass the meanings of "a plurality of" and "multiple", unless explicitly indicated otherwise in the context. Moreover, the terms used herein "comprise" and "include" indicate the existence of the described features, steps, operations and/or components, but do not exclude the existence or addition of one or more other features, steps, operations or components.

All terms used herein (including technical and scientific terms) have the meanings commonly understood by a person skilled in the art, unless defined otherwise. It should be noted that the terms used herein should be interpreted as having the meanings that are consistent in the context of the description, and should not be interpreted in a manner that is idealized or over-rigid.

The drawings show some block diagrams and/or flow charts. It should be understood that some of the blocks in the block diagrams and/or flow charts or a combination thereof may be implemented by computer program instructions. Those computer program instructions may be provided to a processor of a generic computer, a special-purpose computer or another programmable data processing device, whereby those instructions, when executed by the processor, may create a device for implementing the functions/operations that are described in those block diagrams and/or flow charts.

Therefore, the technical solutions according to the present disclosure may be implemented in the form of hardware and/or software (including firmware, microcode etc.). In addition, the technical solutions according to the present disclosure may be in the form of a computer program product on a computer-readable medium storing the instructions, wherein the computer program product may be used by or in combination with an instruction executing system. In the context of the present disclosure, the computer-readable medium may be any medium that can contain, store, transmit, propagate or transport the instructions. For example, the computer-readable medium may include but are not limited to an electric, magnetic, optical, electromagnetic, infrared or semiconductor system, apparatus, device or propagation medium. Particular examples of the computer-readable medium include: a magnetic storage device, such as a magnetic tape or a hard disk (HDD); an optical storage device, such as an optical disc (CD-ROM); a memory, such as a random access memory (RAM) or a flash memory; and/or a wired/wireless communication link.

In order to facilitate describing the way of the directional display of the audio device according to the present embodiment, the structure of the audio device according to the present disclosure will be firstly described in the following embodiment, in which the audio device includes audio products such as a smart loudspeaker box.

Figure 1:
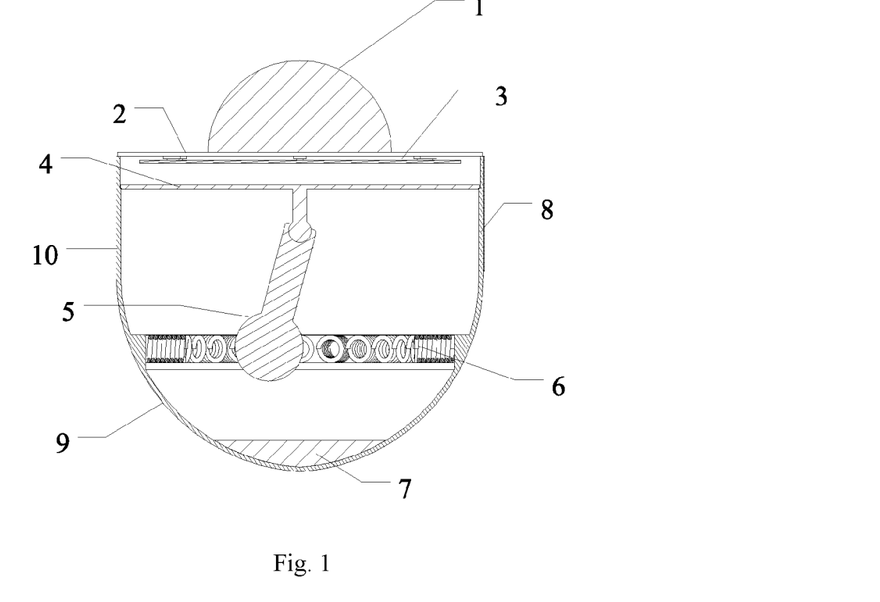
FIG. 1 is a structural diagram of the audio device according to an embodiment of the present disclosure.
Figure 2:
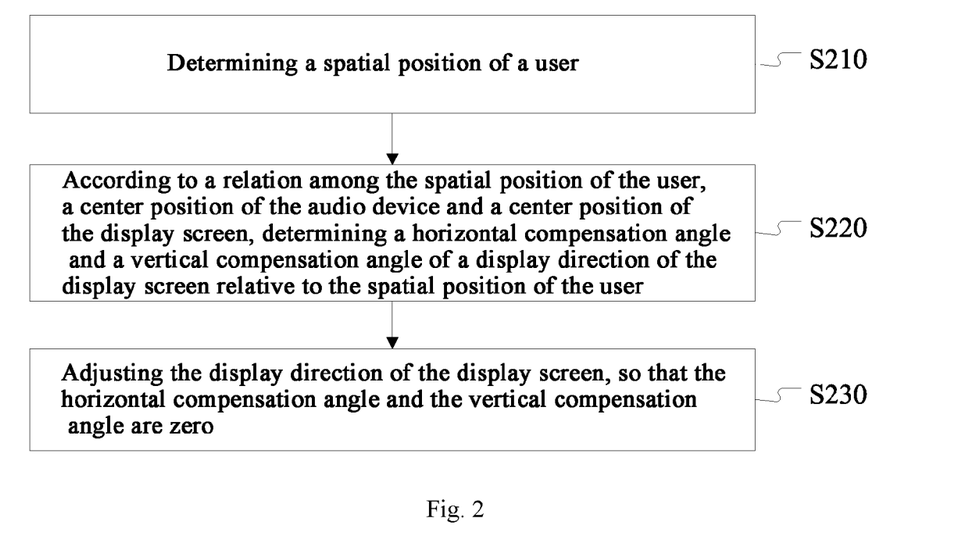
FIG. 2 is a flow chart of the directional display method of an audio device according to an embodiment of the present disclosure.
Figure 3:
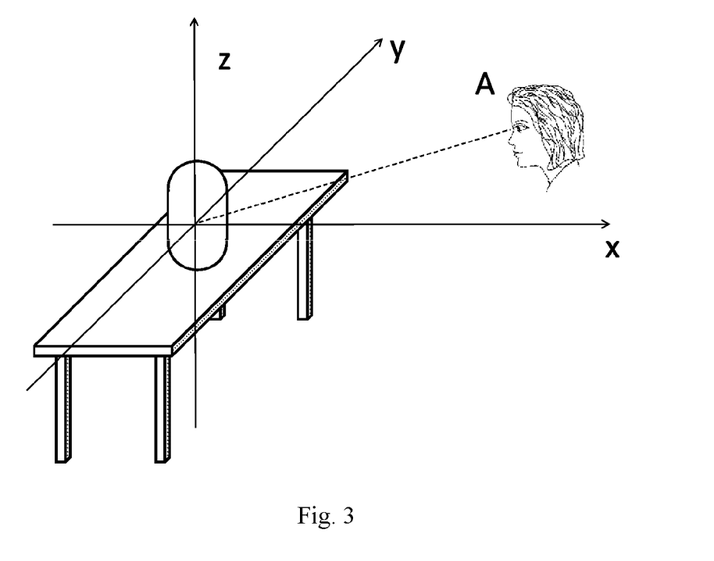
FIG. 3 is a schematic diagram shows that the user is using the audio device according to an embodiment of the present disclosure.

As shown in FIG. 1, the audio device comprises a housing (2, 9, 10) whose bottom is of an egg-shaped structure. The housing comprises a lower housing 9, an upper housing 10 and a top cover 2. The bottom of the lower housing 9 is of an egg-shaped structure, i.e. a quasi-hemisphere, as shown in FIG. 2. The lower housing 9 and the upper housing 10 are meshed via a gear. The upper housing 10 is of a cylindrical structure. In an example, a gear is provided inside the upper housing 10, a ring of mesh teeth that meshes with the gear is provided on the inner wall of the lower housing 9, the gear is driven by an electric motor, and the top cover 2 may be fixed to the upper end of the upper housing 10 by gluing or screw fastening. A spherical camera array 1 is provided on the top cover 2. The spherical camera array 1 comprises a panoramic camera and at least two sets of binocular cameras at the top of the audio device. A display screen 8 is provided at the upper housing 10. An electric motor drives the gear to rotate and further drives the upper housing to rotate horizontally, to realize the horizontal adjustment of the display direction of the display screen 8.

A movable swinger 5 is provided inside the housing and is suspended in the center position of the housing by a fixing support 4. An annular electromagnetic assembly 6 that surrounds the swinger is provided on the inner side wall of the housing. In an example, the electromagnetic assembly comprises an annular array that is formed by multiple solenoids, and the annular array of the multiple solenoids is fixed to the inner side wall of the housing. In order to ensure accurately controlling the swinger to have an expected movement, the annular array of the multiple solenoids is an annular axial array that evenly surrounds and is located on the inner side wall of the bottom of the lower housing. The higher the quantity of the solenoids, the higher the controlling accuracy, and the quantity of the solenoids may be set according to the requirement on the accuracy. By controlling the annular electromagnetic assembly to generate the magnetic field force having a preset magnitude and direction, to draw the swinger to swing, thereby realizing inclining of the display direction of the display screen with a desired angle.

In the present embodiment, the display screen of the audio device can follow the upper housing to rotate in the horizontal direction, and follow the swing of the swinger to incline in the vertical direction. Accordingly, the display screen of the audio device can be controlled according to the following mode of directional display, to realize the function of the display screen of accurately and directionally tracking the user.

One aspect of the present disclosure provides a directional display method of an audio device.

In the present embodiment, the audio device comprises a display screen whose position is adjustable. The structure of the audio device according to the present embodiment may refer to the above relevant description.

FIG. 2 is a flow chart of the directional display method of an audio device according to an embodiment of the present disclosure. as shown in FIG. 2, the method according to the present embodiment comprises:

S210: determining a spatial position of a user.

S220: according to a relation among the spatial position of the user, a center position of the audio device and a center position of the display screen, determining a horizontal compensation angle and a vertical compensation angle of a display direction of the display screen relative to the spatial position of the user.

S230: adjusting the display direction of the display screen, so that the horizontal compensation angle and the vertical compensation angle are zero.

The present embodiment, after determining the spatial position of the user, by using the position relation among the spatial position of the user, the center position of the audio device and the center position of the display screen, determines the horizontal compensation angle and the vertical compensation angle of the display direction of the display screen relative to the spatial position of the user; and by adjusting the two degrees of freedom of the display screen, adjusts both of the horizontal compensation angle and the vertical compensation angle to be zero, to realize that the display direction of the display screen in real time and accurately points to the spatial position of the user, which ensures that the user is within the optimum watching area of the audio device, thereby improving the visual experience of the user.

The steps S210-S230 will be described in detail below with reference to FIGS. 2-7.

Firstly, the step S210 is performed, i.e., determining a spatial position of a user, wherein the spatial position of the user comprises a position of an eye of the user. The present embodiment, preferably, determines the position of the eye of the user, in other words, the spatial position of the user may be understood as the middle position of the two eyes of the user. In an embodiment, the spatial position of the user is determined by the following method: firstly, photographing continuously by using a panoramic camera in the spherical camera array, to acquire panoramic images; subsequently, according to position changes of a foreground relative to a background in the panoramic images at different moments, determining a user in the panoramic images; and subsequently, according to a position of the user in the panoramic images, and a proportional relation between a length of the panoramic images and a length of a first circumference, determining a user position of the user relative to the center position of the audio device, wherein the first circumference is a projection circumference of the spherical camera array in a horizontal plane where the center position of the audio device is located.

In the present embodiment, the panoramic camera in the spherical camera array may be activated in response to an acquired activation signal. The activation signal includes an electric signal that is generated according to a voice signal that carries a preset keyword. The voice signal may be picked up with a microphone array in the audio device and be converted into a electric signal. If the voice signal carries the preset keyword, the panoramic camera is activated according to the carried preset keyword. Then taking photographs continuously by the panoramic camera, and comparing the photographs at different moments, to analyze whether there is a user around the audio device.

Figure 4:
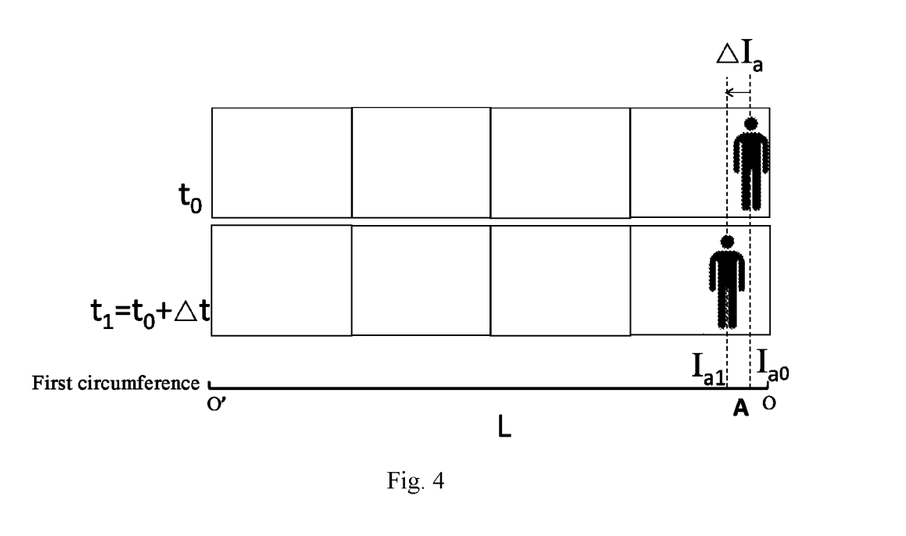
FIG. 4 is a schematic diagram of the panoramic images at different moments according to an embodiment of the present disclosure.

The user cannot be absolutely stationary at any instant, but a panoramic camera having a high definition can perfectly capture the movement of the user. As shown in FIG. 4, the target A and the audio device are located in a same space, and after the photographing of the panoramic camera has been completed, two panoramic images at moment t0 and moment t1 are acquired, and by comparing the positional changes of the same target in the two panoramic images, it can be determined whether the target is a user.

Taking the target A as an example, at moment t0, the target A is located at the position Ia0, and at moment t1, the target A is located at the position Ia1. Accordingly, it can be determined that the target A has a position difference Ala between the moment t0 and the moment t1, which indicates that, at this point, the target A has moved in the same background, and the target A is determined as a user.

Figure 5:
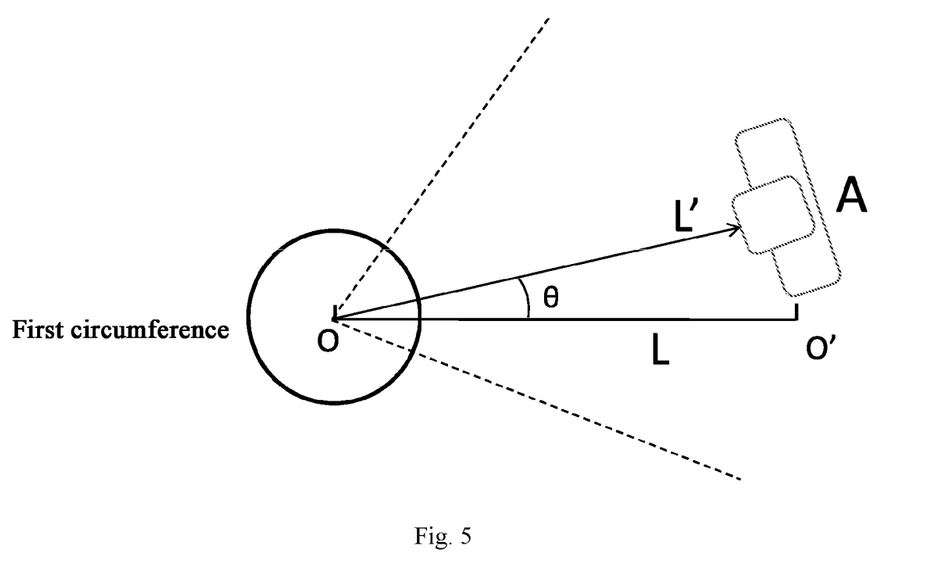
FIG. 5 is a schematic diagram of the relative position relation between the user and the first circumference according to an embodiment of the present disclosure.

After analyzing the panoramic images of different moments and determining that there is a user in the panoramic images, according to the proportional relation between the length of the panoramic images and the length of the first circumference, according to a position of the user in the panoramic images, the position of the user relative to the first circumference can be determined. As shown in FIG. 4, the projection circumference of the spherical camera array in the horizontal plane where the center position of the audio device is located is a line segment having a certain length after expanded. In FIG. 4, the length of the first circumference is L, and the position of the circle center of the first circumference and the center position of the audio device are the same position. If using one end O of the line segment as the base point, and assuming that the base point O of the line segment corresponds to the right end of the panoramic image, it is determined that in the panoramic image at the moment t1, the distance between the user A in the panoramic image and the right end of the panoramic image is Ia1, then according to the formula $$\theta = 2\pi \frac{\Delta I_{a1}}{L},$$

it can be determined that the position of the user A relative to the first circumference is the direction that forms an angle θ with the direction OO'; in other words, the direction of the ray L' in FIG. 5 is the direction of the user A relative to the center position of the audio device.

After determining the spatial position of the user, subsequently, the step S220 is performed, i.e., according to a relation among the spatial position of the user, the center position of the audio device and the center position of the display screen, determining a horizontal compensation angle and a vertical compensation angle of a display direction of the display screen relative to the spatial position of the user, wherein the display direction of the display screen comprises a direction indicated by a first connecting line between the center position of the audio device and the center position of the display screen, and the center position of the audio device is located on a space vertical central line of the audio device.

The position of the user that is determined by analyzing the panoramic images is the direction of the user relative to the center position of the audio device, therefore the horizontal position and the vertical position of the eyes of the user relative to the center position of the audio device cannot be accurately located. In view of that, in the present disclosure, after determining the direction of the user relative to the center position of the audio device with the panoramic images, activating the binocular cameras facing the direction of the user, photographing in the direction of the user, and by using the images of the user photographed by the binocular cameras and according to the distance between the binocular cameras, determining the horizontal position and the vertical position of the eyes of the user relative to the center position of the audio device, and then determining the horizontal compensation angle and the vertical compensation angle of the display direction of the display screen relative to the eyes of the user, and adjusting the display direction of the display screen based on the horizontal compensation angle and the vertical compensation angle, so that the adjusted center position of the display screen points to the eyes of the user, which realizes that the display screen accurately tracks the position of the user for directional display, thereby ensuring the optimum visual experience of the user.

In an embodiment, the horizontal compensation angle of the display direction of the display screen relative to the spatial position of the user is determined by the following method: firstly, establishing a horizontal-plane rectangular coordinate system with the center position of the audio device as an origin; subsequently, by using a binocular camera whose horizontal direction corresponds to the user position in the spherical camera array, determining a horizontal position coordinate of the user; and subsequently, according to a second connecting line between the horizontal position coordinate and the center position of the audio device and the first connecting line, forming the horizontal compensation angle in the horizontal-plane rectangular coordinate system.

Figure 6:
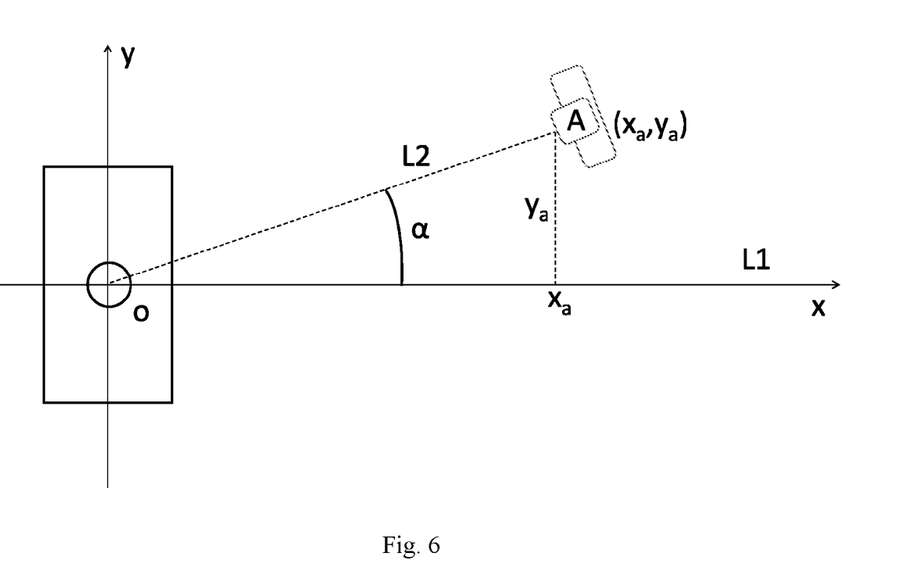
FIG. 6 is a schematic diagram of the user in a rectangular plane coordinate system according to an embodiment of the present disclosure.

As shown in FIG. 6, the method may comprise establishing a horizontal-plane rectangular coordinate system with the center position of the audio device as the origin, wherein the x-axis of the established horizontal-plane rectangular coordinate system is the straight line where the connecting line between the current center position of the display screen and the center position of the audio device is located, in other words, the current first connecting line is the x-axis, locating the horizontal position coordinate (xa, ya) of the user in the following manner, forming the horizontal compensation angle α in the horizontal-plane rectangular coordinate system according to the second connecting line L2 between the horizontal position coordinate and the center position of the audio device and the first connecting line L1 (i.e., the positive direction of the x-axis). Referring to FIG. 6, determining the included angle α formed by the connecting line between the point at the horizontal position coordinate of the user and the origin of coordinates O and the x-axis as the horizontal compensation angle, as shown in FIG. 6. According to tan α=|ya|/|xa|, the horizontal compensation angle can be obtained. Because the user has a certain width in the horizontal direction, when the analysis and identification is performed by using the images photographed by binocular cameras, the relative center point of the user in the horizontal direction is acquired to represent the horizontal position of the user A, for example, using the center position between the two eyes of the user to represent the horizontal position of the user A.

In an implementation, the horizontal position coordinate of the user in the horizontal-plane rectangular coordinate system is determined by distance measurement of the binocular cameras. For example, the horizontal position coordinate of the user can be determined, by using the distance parameter between the binocular cameras that photograph the images of the user in the spherical camera array, and based on the position difference of a same target in the images photographed by the binocular cameras.

In another implementation, the horizontal position coordinate of the user in the horizontal-plane rectangular coordinate system may be detected by using a distance measuring device in combination with binocular cameras. For example, when a light-sensitive measuring device is used, the light-sensitive measuring device can detect the photographing action of the camera, and measure the relative angle between the camera and the light-sensitive measuring device. When the user is wearing a light-sensitive measuring device, according to the time difference between the moments that the photographing actions of the cameras are detected by the light-sensitive measuring device, the position coordinate is measured and calculated. Ultrasonic distance measurement or laser distance measurement may also be used to acquire the coordinate position of the user.

In another embodiment, the vertical compensation angle of the display direction of the display screen relative to the position of the eyes of the user is determined by using the following method: firstly, establishing a vertical-plane rectangular coordinate system with the center position of the audio device as an origin; subsequently, by using a binocular camera whose vertical direction corresponds to the user position in the spherical camera array, determining a vertical position coordinate of an eye of the user; and, subsequently, according to a third connecting line between the vertical position coordinate and the center position of the audio device and the first connecting line, forming the vertical compensation angle in the vertical-plane rectangular coordinate system.

Figure 7:
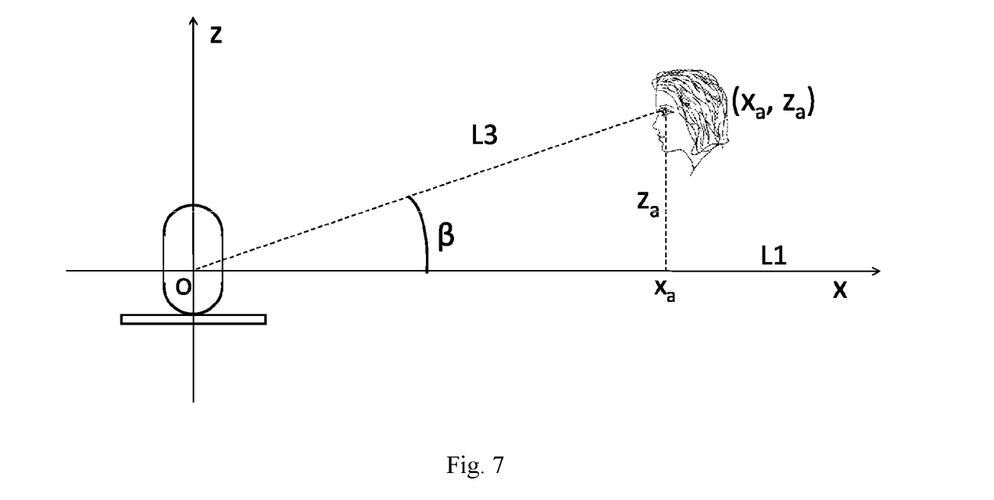
FIG. 7 is a schematic diagram of the user in a rectangular vertical coordinate system according to an embodiment of the present disclosure.

As shown in FIG. 7, the method may comprise establishing a vertical-plane rectangular coordinate system with the center position of the audio device as the origin, wherein the x-axis of the established vertical-plane rectangular coordinate system is the straight line where the connecting line of the current center position of the display screen and the center position of the audio device is located, or in other words, the current first connecting line is the x-axis, locating the vertical position coordinate (xa, za) of the user in the following manner: forming the vertical compensation angle β in in the vertical-plane rectangular coordinate system according to the third connecting line L3 between the vertical position coordinate and the center position of the audio device and the first connecting line L1 (i.e., the positive direction of the x-axis), and referring to FIG. 7, determining the included angle β formed by the connecting line L3 between the point at the vertical position coordinate of the eyes of the user and the origin of coordinates O and the x-axis as the vertical compensation angle, as shown in FIG. 7. According to tan β=|za|/|xa|, the vertical compensation angle β can be obtained.

In an implementation, the vertical position coordinate of the eye of the user in the vertical-plane rectangular coordinate system is determined by distance measurement of the binocular cameras. For example, the method may comprise, by using the distance parameter between the binocular cameras that photographed the images of the user in the spherical camera array, and based on the position difference between the eyes in the images photographing by the binocular cameras, determining the vertical position coordinate of the eye of the user.

In another implementation, the vertical position coordinate of the eye of the user in the vertical-plane rectangular coordinate system may be detected by using a distance measuring device in combination with binocular cameras. For example, when a light-sensitive measuring device is used, the light-sensitive measuring device can detect the photographing actions of the camera, and measure the relative angle between the camera and the light-sensitive measuring device. When the user is wearing a light-sensitive measuring device, according to the time difference between the moments that the photographing actions of the cameras is detected by the light-sensitive measuring device, the position coordinate is measured and calculated. Ultrasonic distance measurement or laser distance measurement may also be used to acquire the coordinate position of the eye of the user.

After determining the horizontal compensation angle and the vertical compensation angle of the display direction of the display screen relative to the spatial position of the user, subsequently the step S230 is performed, i.e., adjusting the display direction of the display screen, so that the horizontal compensation angle and the vertical compensation angle are zero.

In the present embodiment, the display screen is provided on a target housing. For example, referring to FIG. 1, the target housing is the upper housing of the audio device, the display screen is provided at the upper housing, and the audio device comprises therein a movable swinger and an electromagnetic assembly that surrounds the swinger. The present embodiment may drive the target housing of the audio device to rotate in the horizontal direction, so that the horizontal compensation angle is zero, to realize the rotation of the display screen in the horizontal direction; and by controlling the electromagnetic assembly to generate a magnetic field force having preset magnitude, direction and/or preset frequency, drive the swinger to move in the internal space of the audio device, so that the vertical compensation angle is zero, to realize the inclining of the display screen in the vertical direction.

In combination with the audio device shown in FIG. 1, by driving the gear by a electric motor to drive the upper housing to rotate, realize the rotation of the display screen in the horizontal direction; and by driving the swinger to swing to cause a change of the gravity center of the audio device, realize the inclining of the display screen in the vertical direction. The present embodiment can realize the two degrees of freedom of the display direction of the display screen, i.e. an adjustment of the vertical angle corresponding to the pitching direction of the audio device and the horizontal angle corresponding to the rotation direction of the audio device, to accurately control the directional display of the audio device, thereby improving the visual experience of the user.

Another aspect of the present disclosure provides a directional display apparatus of an audio device.

In the present embodiment, the audio device comprises a display screen whose position is adjustable. The structure of the audio device according to the present embodiment may refer to the above relevant description.

Figure 8:
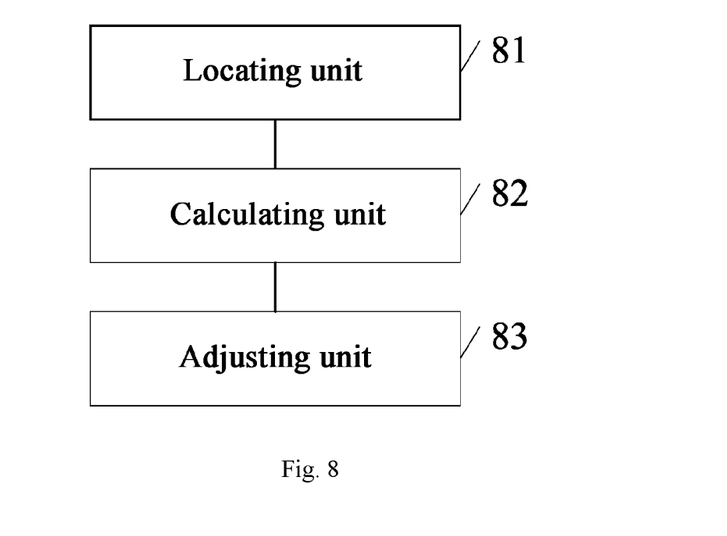
FIG. 8 is a block diagram of a structure of the directional display apparatus of an audio device according to an embodiment of the present disclosure.

FIG. 8 is a structure block diagram of the directional display apparatus of an audio device according to an embodiment of the present disclosure. as shown in FIG. 8, the apparatus according to the present embodiment comprises:

a locating unit 81 configured for determining a spatial position of a user;

a calculating unit 82 configured for, according to a relation among the spatial position of the user, a center position of the audio device and a center position of the display screen, determining a horizontal compensation angle and a vertical compensation angle of a display direction of the display screen relative to the spatial position of the user; and a adjusting unit 83 configured for adjusting the display direction of the display screen, so that the horizontal compensation angle and the vertical compensation angle are zero.

In the directional display apparatus according to the present embodiment, after determining the spatial position of the user by the locating unit, the calculating unit uses the position relation among the spatial position of the user, the center position of the audio device and the center position of the display screen, to determine the horizontal compensation angle and the vertical compensation angle of the display direction of the display screen relative to the spatial position of the user; the adjusting unit adjusts the two degrees of freedom of the display screen, so that both of the horizontal compensation angle and the vertical compensation angle are zero, and realize that the display direction of the display screen points to the spatial position of the user in real time and accurately, which ensures that the user is within the optimum watching area of the audio device, thereby improving the visual experience of the user.

The display direction of the display screen comprises a direction indicated by a first connecting line between the center position of the audio device and the center position of the display screen, and the center position of the audio device is located on a space vertical central line of the audio device.

In the present embodiment, the audio device further comprises a spherical camera array, and the locating unit 81 is configured for photographing continuously by using a panoramic camera in the spherical camera array, to acquire panoramic images; according to position changes of a foreground relative to a background in the panoramic images at different moments, determining a user that exists in the panoramic images; and according to a position of the user in the panoramic images, and a proportional relation between a length of the panoramic images and a length of a first circumference, determining a user position of the user relative to the center position of the audio device, wherein the first circumference is a projection circumference of the spherical camera array in a horizontal plane where the center position of the audio device is located.

The calculating unit 82 comprises: a horizontal compensation angle calculating module and a vertical compensation angle calculating module; and the horizontal compensation angle calculating module is configured for establishing a horizontal-plane rectangular coordinate system with the center position of the audio device as an origin; by using a binocular camera whose horizontal direction corresponds to the user position in the spherical camera array, determining a horizontal position coordinate of the user; and according to a second connecting line between the horizontal position coordinate and the center position of the audio device and the first connecting line, forming the horizontal compensation angle in the horizontal-plane rectangular coordinate system.

The vertical compensation angle calculating module is configured for establishing a vertical-plane rectangular coordinate system with the center position of the audio device as an origin; by using a binocular camera whose vertical direction corresponds to the user position in the spherical camera array, determining a vertical position coordinate of an eye of the user; and according to a third connecting line between the vertical position coordinate and the center position of the audio device and the first connecting line, forming the vertical compensation angle in the vertical-plane rectangular coordinate system.

In an embodiment, the display screen is provided on a target housing, and the audio device comprises therein a movable swinger and an electromagnetic assembly that surrounds the swinger.

Correspondingly, the adjusting unit 83 is configured for driving a rotation of the target housing of the audio device in a horizontal direction, so that the horizontal compensation angle is zero; and further configured for, by controlling the electromagnetic assembly to generate a magnetic field force having preset magnitude, direction and/or preset frequency, driving the swinger to move in an internal space of the audio device, so that the vertical compensation angle is zero.

The device embodiments are substantially correspond to the method embodiments, so the relevant contents may refer to the description of the corresponding parts of the method embodiments. The device embodiments described above are merely illustrative, in which the units described as separate components may or may not be physically separated, and the components illustrated as units may or may not be physical units. In other words, they may be located in one place, or distributed in multiple network units. Some or all of the modules can be selected according to actual needs to achieve the objectives of the solutions of the present embodiment. Those of ordinary skill in the art can understand and implement them without paying creative efforts.

Another aspect of the present disclosure provides an audio device.

Figure 9:
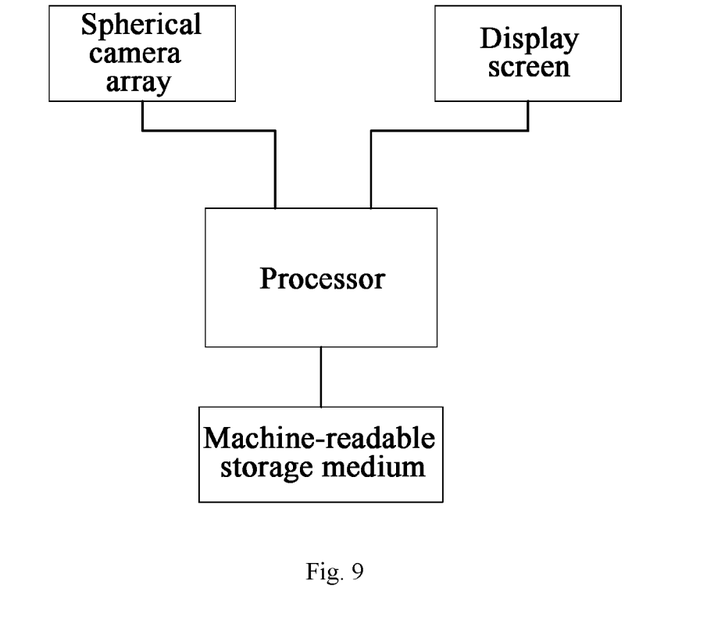
FIG. 9 is a block diagram of a structure of the audio device according to an embodiment of the present disclosure.

FIG. 9 is a structural block diagram of the audio device according to an embodiment of the present disclosure. As shown in FIG. 9, the audio device according to the present embodiment comprises a spherical camera array and a display screen whose position is adjustable, and further comprises a processor and a machine-readable storage medium that stores a machine-executable instruction, and by reading and executing the machine-executable instruction in the machine-readable storage medium, the processor is able to implement the directional display method of an audio device described above.

The audio device according to the present embodiment, after determining the spatial position of the user, by using the position relation among the spatial position of the user, the center position of the audio device and the center position of the display screen, can determine the horizontal compensation angle and the vertical compensation angle of the display direction of the display screen relative to the spatial position of the user; and, by adjusting the two degrees of freedom of the display screen, to adjust both of the horizontal compensation angle and the vertical compensation angle to be zero, can realize that the display direction of the display screen points to the spatial position of the user in real time and accurately, which ensures that the user is within the optimum watching area of the audio device, thereby improving the visual experience of the user.

In the present embodiment, the center position of the audio device is located on a space vertical central line of the audio device. The spherical camera array comprises a panoramic camera and at least two sets of binocular cameras located at a top of the audio device. The display screen whose position is adjustable is provided at an upper housing of an housing of the audio device, a gear is provided inside the upper housing of the audio device, a ring of mesh teeth that meshes with the gear is provided at an inner wall of a lower housing of the audio device, and the gear is driven by an electric motor. The bottom of the lower housing of the audio device is of an egg-shaped structure, a movable swinger is suspended at a center position inside the housing, an annular electromagnetic assembly that surrounds the swinger is provided on an inner side wall of the housing, and by controlling the annular electromagnetic assembly to generate a magnetic field force having preset magnitude, direction and/or preset frequency, the swinger is driven to move, so that the display direction of the display screen inclines in an desired angle.

Another aspect of the present disclosure provides a system.

Figure 10:
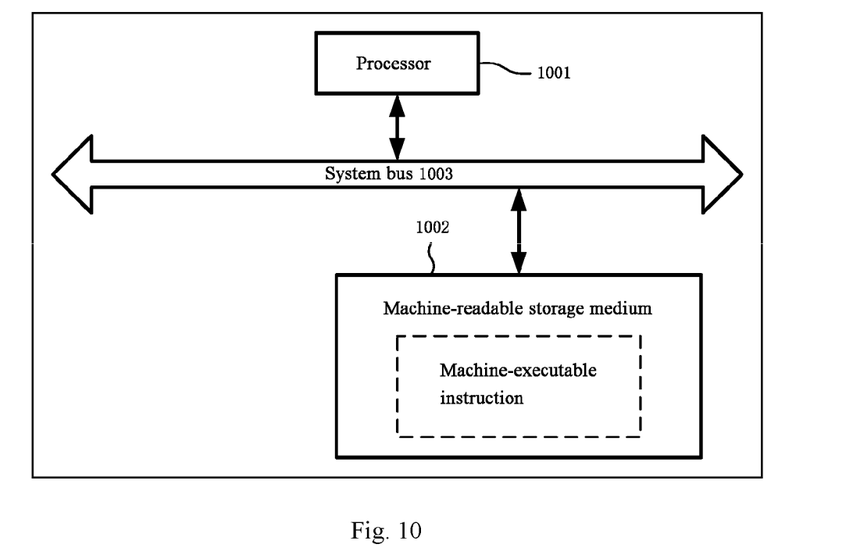
FIG. 10 is a schematic diagram of a hardware structure of the system according to an embodiment of the present disclosure.

The system according to the present application may be implemented by software, and may also be implemented by hardware or a combination of software and hardware. Taking the software implementation as an example, referring to FIG. 10, the system according to the present disclosure may comprise a processor 1001 and a machine-readable storage medium 1002 that stores a machine-executable instruction. The processor 1001 and the machine-readable storage medium 1002 may communicate via a system bus 1003. Furthermore, by reading and executing the machine-executable instruction in the machine-readable storage medium 1002 corresponds to the logic of the directional display of the audio device, the processor 1001 can implement the directional display method of an audio device described above.

Another aspect of the present disclosure provides a machine-readable storage medium.

The machine-readable storage medium according to the embodiment of the present disclosure stores a machine-executable instruction, and the machine-executable instruction, when executed by a processor, implements the directional display method of an audio device described above.

It should be noted that the readable storage medium according to the embodiment of the present disclosure may, for example, be any medium that can contain, store, transmit, propagate or transport the instruction. For example, the readable storage medium may include but is not limited to an electric, magnetic, optical, electromagnetic, infrared or semiconductor system, apparatus, device or propagation medium. Particular examples of the readable storage medium include: a magnetic storage device, such as a magnetic tape or a hard disk (HDD); an optical storage device, such as an optical disc (CD-ROM); a memory, such as a random access memory (RAM) or a flash memory; and/or a wired/wireless communication link.

The machine-readable storage medium may contain a computer program, and the computer program may contain a code/computer-executable instruction, which, when executed by a processor, for example, the process of the directional display method of an audio device described above and any equivalent thereof are executed by the processor.

The computer program may be configured to have a computer program code containing, for example, a computer program module. For example, in an exemplary embodiment, the code in the computer program may comprise one or more program modules. It should be noted that the division method and the quantity of the modules are not fixed, and a person skilled in the art can use suitable program modules or a combination of program modules according to actual conditions. When the combination of those program modules is executed by a processor, the processor can implement, for example, the process of the directional display method of an audio device described above and any equivalent thereof.

In order to facilitate the clear description on the technical solutions of the embodiments of the present disclosure, in the embodiments of the present disclosure, terms such as "first" and "second" are used to distinguish identical items or similar items that have substantially the same functions and effects, and a person skilled in the art can understand that the terms such as "first" and "second" do not limit the quantity and the execution order.

The above are merely particular embodiments of the present disclosure. By the teaching of the present disclosure, a person skilled in the art can make other modifications or variations on the basis of the above embodiments. A person skilled in the art should understand that the above particular descriptions are only for the purpose of better interpreting the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A directional display method of an audio device, wherein the audio device comprises a display screen whose position is adjustable, and the method comprises:
   determining a spatial position of a user;
   according to a relation among the spatial position of the user, a center position of the audio device and a center position of the display screen, determining a horizontal compensation angle and a vertical compensation angle of a display direction of the display screen relative to the spatial position of the user; and
   adjusting the display direction of the display screen, so that the horizontal compensation angle and the vertical compensation angle are zero.

2. The method according to claim 1, wherein the spatial position of the user comprises a position of an eye of the user.

3. The method according to claim 1, wherein the display direction of the display screen comprises a direction indicated by a first connecting line between the center position of the audio device and the center position of the display screen, and the center position of the audio device is located on a space vertical central line of the audio device.

4. The method according to claim 3, wherein the audio device further comprises a spherical camera array, and determining the spatial position of the user comprises:
   photographing continuously by using a panoramic camera in the spherical camera array, to acquire panoramic images;
   according to a position changes of a foreground relative to a background in the panoramic images at different moments, determining a user that exists in the panoramic images; and
   according to a position of the user in the panoramic images, and a proportional relation between a length of the panoramic images and a length of the first circumference, determining a user position of the user relative to the center position of the audio device, wherein the first circumference is a projection circumference of the spherical camera array in a horizontal plane where the center position of the audio device is located.

5. The method according to claim 4, wherein determining the horizontal compensation angle and the vertical compensation angle of the display direction of the display screen relative to the spatial position of the user comprises:
   establishing a horizontal-plane rectangular coordinate system with the center position of the audio device as an origin;
   by using a binocular camera whose horizontal direction corresponds to the user position in the spherical camera array, determining a horizontal position coordinate of the user; and
   according to a second connecting line between the horizontal position coordinate and the center position of the audio device and the first connecting line, forming the horizontal compensation angle in the horizontal-plane rectangular coordinate system.

6. The method according to claim 5, wherein the display screen is provided on a target housing, and adjusting the display direction of the display screen comprises: driving the target housing of the audio device to rotate in a horizontal direction, so that the horizontal compensation angle is zero.

7. The method according to claim 4, wherein determining the horizontal compensation angle and the vertical compensation angle of the display direction of the display screen relative to the spatial position of the user comprises:
   establishing a vertical-plane rectangular coordinate system with the center position of the audio device as an origin;

by using a binocular camera whose vertical direction corresponds to the user position in the spherical camera array, determining a vertical position coordinate of an eye of the user; and according to a third connecting line between the vertical position coordinate and the center position of the audio device and the first connecting line, forming the vertical compensation angle in the vertical-plane rectangular coordinate system.

8. The method according to claim 7, wherein the audio device comprises therein a movable swinger and an electromagnetic assembly that surrounds the swinger, and adjusting the display direction of the display screen comprises: by controlling the electromagnetic assembly to generate a magnetic field force having preset magnitude, direction and/or preset frequency, driving the swinger to move in an internal space of the audio device, so that the vertical compensation angle is zero.

9. A directional display apparatus of an audio device, wherein the audio device comprises a display screen whose position is adjustable, and the apparatus comprises:
 a locating unit configured for determining a spatial position of a user;
 a calculating unit configured for, according to a relation among the spatial position of the user, a center position of the audio device and a center position of the display screen, determining a horizontal compensation angle and a vertical compensation angle of a display direction of the display screen relative to the spatial position of the user; and
 an adjusting unit configured for adjusting the display direction of the display screen, so that the horizontal compensation angle and the vertical compensation angle are zero.

10. An audio device, comprises a spherical camera array and a display screen whose position is adjustable, and further comprises a processor and a non-transitory machine-readable storage medium that stores a machine-executable instruction, and, by reading and executing the machine-executable instruction in the non-transitory machine-readable storage medium, the directional display method of an audio device according to claim 1 can be implemented by the processor.

11. The audio device according to claim 10, wherein the spherical camera array comprises a panoramic camera and at least two sets of binocular cameras located at a top of the audio device.

12. The audio device according to claim 10, wherein the display screen whose position is adjustable is provided at an upper housing of an housing of the audio device, a gear is provided inside the upper housing of the audio device, a ring of mesh teeth that meshes with the gear is provided at an inner wall of a lower housing of the audio device, and the gear is driven by an electric motor.

13. The audio device according to claim 12, wherein a bottom of the lower housing is of an egg-shaped structure, a movable swinger is suspended in a center position inside the housing, an annular electromagnetic assembly that surrounds the swinger is provided on an inner side wall of the housing, and by controlling the annular electromagnetic assembly to generate a magnetic field force having preset magnitude, direction and/or preset frequency, the swinger is driven to move, so that the display direction of the display screen inclines in an desired angle.

14. A non-transitory machine-readable storage medium, wherein the non-transitory machine-readable storage medium stores a machine-executable instruction, and the machine-executable instruction, when executed by a processor, implements the directional display method of an audio device according to claim any one of claim 1.

15. An audio device, comprises a spherical camera array and a display screen whose position is adjustable, and further comprises a processor and a non-transitory machine-readable storage medium that stores a machine-executable instruction, and, by reading and executing the machine-executable instruction in the non-transitory machine-readable storage medium, the directional display method of an audio device according to claim 2 can be implemented by the processor.

* * * * *

UNITED STATES PATENT AND TRADEMARK OFFICE
CERTIFICATE OF CORRECTION

| | |
|---|---|
| PATENT NO. | : 11,551,633 B2 |
| APPLICATION NO. | : 17/309139 |
| DATED | : January 10, 2023 |
| INVENTOR(S) | : Jifu Zhao et al. |

It is certified that error appears in the above-identified patent and that said Letters Patent is hereby corrected as shown below:

On the Title Page

Item (73) Assignee: "GOERIEK INC." should be replaced with --GOERTEK INC.--

Signed and Sealed this
Fourth Day of July, 2023

Katherine Kelly Vidal
*Director of the United States Patent and Trademark Office*